US008788275B2

(12) United States Patent
Shirakawa et al.

(10) Patent No.: US 8,788,275 B2
(45) Date of Patent: Jul. 22, 2014

(54) DECODING METHOD AND APPARATUS FOR AN AUDIO SIGNAL THROUGH HIGH FREQUENCY COMPENSATION

(75) Inventors: Miyuki Shirakawa, Fukuoka (JP); Masanao Suzuki, Kanagawa (JP); Takashi Makiuchi, Fukuoka (JP); Yoshiteru Tsuchinaga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1826 days.

(21) Appl. No.: 11/902,325

(22) Filed: Sep. 20, 2007

(65) Prior Publication Data

US 2008/0126102 A1 May 29, 2008

(30) Foreign Application Priority Data

Nov. 24, 2006 (JP) ................................. 2006-317647

(51) Int. Cl.

| | |
|---|---|
| ***G06F 15/00*** | (2006.01) |
| ***G10L 11/04*** | (2006.01) |
| ***G10L 19/00*** | (2006.01) |
| ***G10L 21/04*** | (2006.01) |
| ***G10L 19/14*** | (2006.01) |

(52) U.S. Cl.

USPC ........... 704/500; 704/200; 704/205; 704/206; 704/503; 704/504; 704/225

(58) Field of Classification Search

USPC .......... 704/200, 205, 206, 500, 503, 504, 225
See application file for complete search history.

(56) References Cited

U.S. PATENT DOCUMENTS

| | | | | |
|---|---|---|---|---|
| 6,539,355 | B1 * | 3/2003 | Omori et al. | 704/268 |
| 6,691,085 | B1 * | 2/2004 | Rotola-Pukkila et al. | 704/228 |
| 6,895,375 | B2 * | 5/2005 | Malah et al. | 704/219 |
| 7,069,212 | B2 * | 6/2006 | Tanaka et al. | 704/225 |
| 2003/0187663 | A1 * | 10/2003 | Truman et al. | 704/500 |

(Continued)

FOREIGN PATENT DOCUMENTS

| | | |
|---|---|---|
| JP | 2001-521648 | 11/2001 |
| JP | 2002-73088 | 3/2002 |

(Continued)

OTHER PUBLICATIONS

Japanese Office Action for corresponding Japanese Application No. 2006-317647, mailed on Jun. 7, 2011.

(Continued)

*Primary Examiner* — Paras D Shah
(74) *Attorney, Agent, or Firm* — Staas & Halsey LLP

(57) ABSTRACT

A decoding apparatus decodes a first encoded data that is encoded from a low-frequency component of an audio signal, and a second encoded data that is used when creating a high-frequency component of an audio signal from a low-frequency component and encoded in accordance with a certain bandwidth, into the audio signal. In the decoding apparatus, a high-frequency component detecting unit divides the high-frequency component into bands with a certain interval range correspondingly to the certain bandwidth, and detects magnitude of the high-frequency components corresponding to each of the bands. A high-frequency component compensating unit compensates the high-frequency components based on the magnitude of the high-frequency components corresponding to each of the bands detected by the high-frequency component detecting unit. A decoding unit that decodes the low-frequency component decoded from the first encoded data, and the high-frequency components compensated by the high-frequency component compensating unit, into the audio signal.

8 Claims, 17 Drawing Sheets

(56) References Cited

U.S. PATENT DOCUMENTS

| | | | | |
|---|---|---|---|---|
| 2003/0202600 | A1 | 10/2003 | Sato | |
| 2004/0098431 | A1 | 5/2004 | Sato | |
| 2005/0096917 | A1 * | 5/2005 | Kjorling et al. | 704/500 |
| 2006/0031075 | A1 | 2/2006 | Oh et al. | |
| 2007/0129036 | A1 * | 6/2007 | Arora | 455/205 |
| 2008/0262835 | A1 | 10/2008 | Oshikiri | |

FOREIGN PATENT DOCUMENTS

| | | |
|---|---|---|
| JP | 2004-198485 | 7/2004 |
| JP | 2006-48043 | 2/2006 |
| WO | 98/57436 | 12/1998 |
| WO | 03/003345 | 1/2003 |
| WO | 2005/112001 | 11/2005 |

OTHER PUBLICATIONS

"G.729-based embedded variable bit-rate coder: An 8-32 kbit/s scalable wideband coder bitstream interoperable with G.729; G.729.1 (May 2006)," ITU-T Telecommunication Standardization Sector of ITU, International Telecommunication Union, May 2006, 99 pages.

Extended European Search Report for related European Patent Application No. 07018370.2, issued on Jul. 8, 2011.

* cited by examiner (a) ESTIMATION OF POWER CHANGE (a) ESTIMATION OF POWER CHANGE

DECODING METHOD AND APPARATUS FOR AN AUDIO SIGNAL THROUGH HIGH FREQUENCY COMPENSATION

BACKGROUND OF THE INVENTION

1. Field of the Invention

The present invention relates to a technology for decoding an audio signal.

2. Description of the Related Art

Recently, the High-Efficiency Advanced Audio Coding (HE-AAC) method is used for encoding voice, sound, and music. The HE-AAC method is an audio compression method, which is principally used, for example, by the Moving Picture Experts Group phase 2 (MPEG-2), or the Moving Picture Experts Group phase 4 (MPEG-4).

According to encoding by the HE-AAC method, a low-frequency component of an audio signal to be encoded (a signal related to such as voice, sound, and music) is encoded by the Advanced Audio Coding (AAC) method, and a high-frequency component of the audio signal is encoded by the Spectral Band Replication (SBR) method. According to the SBR method, the high-frequency component of the audio signal can be encoded with bit counts fewer than usual by encoding only a portion that cannot be estimated from a low-frequency component of the audio signal. Hereinafter, data encoded by the AAC method is referred to as AAC data, and data encoded by the SBR method is referred to as SBR data.

According to the encoding by the HE-AAC method, the higher the frequency band, the wider the bandwidth divided. Power of the audio signal is evened out in a divided band, and then the audio signal is encoded. As shown in FIG. 15, the audio signal is encoded according to the encoding by the HE-AAC method for the higher the frequency (the frequency of the high-frequency component to be encoded by the SBR method), to the wider the bandwidth divided.

An example of a decoder for decoding data encoded by the HE-AAC method (HE-AAC data) is explained below. As shown in FIG. 16, the decoder 10 includes a data separating unit 11, an AAC decoding unit 12, an analyzing filter 13, a high-frequency creating unit 14, and a synthesizing filter 15.

When the data separating unit 11 acquires the HE-AAC data, the data separating unit 11 separates the HE-AAC data into the AAC data and the SBR data, outputs the AAC data to the AAC decoding unit 12, and outputs the SBR data to the high-frequency creating unit 14.

The AAC decoding unit 12 decodes the AAC data, and outputs the decoded AAC data to the analyzing filter 13 as AAC decoded audio data. The analyzing filter 13 calculates characteristics of time and frequencies related to the low-frequency component of the audio signal based on the AAC decoded audio data acquired from the AAC decoding unit 12, and outputs the calculation result to the synthesizing filter 15 and the high-frequency creating unit 14. Hereinafter, the calculation result output from the analyzing filter 13 is referred to as low-frequency component data.

The high-frequency creating unit 14 creates a high-frequency component of the audio signal based on the SBR data acquired from the data separating unit 11, and the low-frequency component data acquired from the analyzing filter 13. The high-frequency creating unit 14 then outputs the created data of the high-frequency component as a high-frequency component data to the synthesizing filter 15.

The synthesizing filter 15 synthesizes the low-frequency component data acquired from the analyzing filter 13 and the high-frequency component data acquired from the high-frequency creating unit 14, and outputs the synthesized data as HE-AAC output audio data.

Processing performed by the decoder 10 is explained below. The analyzing filter 13 creates low-frequency component data as shown in the left part of FIG. 17. As shown in the right part of FIG. 17, the high-frequency creating unit 14 creates high-frequency component data from the low-frequency component data, and the synthesizing filter 15 synthesizes the low-frequency component data and the high-frequency component data to output the HE-AAC output audio data. Thus, the decoder 10 decodes the audio signal encoded by the HE-AAC data method into the HE-AAC output audio data.

Japanese Patent Application Laid-open No. 2002-73088 discloses a technology for accurately restoring a signal, even if a high-frequency portion of the signal is steeply attenuated. According to the technology, spectra are divided into bands; frequency bands having a strong correlation between each other combined into a pair for deletion and interpolation; the bands for deletion are eliminated and the rest of the bands is shifted to the lower frequency side; and a signal in the higher frequency side is saved; so that the audio signal is compressed while retaining a high sound quality.

However, the conventional technology described above has a problem that the high-frequency component of the audio signal encoded by the SBR method cannot be properly decoded due to poor frequency resolution for the audio signal encoded by the SBR method.

Under the conventional SBR method, the bandwidth of a band to be encoded is wide (the frequency resolution of the SBR method is poor). As shown in FIG. 18, if a portion of a sound, such as a consonant, in which power steeply drops in a band on the high-frequency component side, is encoded with a wide bandwidth, the power within the band is evened out, so that the power is even between the low-frequency side and the high-frequency side, consequently the high-frequency side within the band is emphasized.

As shown in FIG. 18, the audio signal is encoded in a state where the high-frequency side within the band is emphasized. If the audio signal is decoded based on such encoded audio signal, the encoded audio signal is decoded as the high-frequency side within the band is emphasized, so that the audio signal cannot be properly decoded.

In other words, it is strongly required that a decoded audio signal is accurately decoded by compensating the high-frequency component, even if the high-frequency component of the audio signal is not properly encoded.

SUMMARY OF THE INVENTION

It is an object of the present invention to at least partially solve the problems in the conventional technology.

According to an aspect of the present invention, a decoding apparatus that decodes a first encoded data that is encoded from a low-frequency component of an audio signal, and a second encoded data that is used when creating a high-frequency component of an audio signal from a low-frequency component and encoded in accordance with a certain bandwidth, into the audio signal, includes a high-frequency component detecting unit that divides the high-frequency component into bands with a certain interval range correspondingly to the certain bandwidth, and detects magnitude of the high-frequency components corresponding to each of the bands, a high-frequency component compensating unit that compensates the high-frequency components based on the magnitude of the high-frequency components corresponding to each of the bands detected by the high-frequency component detecting unit, and a decoding unit that decodes the low-frequency component decoded from the first encoded data, and the high-frequency components compensated by the high-frequency component compensating unit, into the audio signal.

According to another aspect of the present invention, a decoding method for decoding a first encoded data that is encoded from a low-frequency component of an audio signal, and a second encoded data that is used when creating a high-frequency component of an audio signal from a low-frequency component and encoded in accordance with a certain bandwidth, into the audio signal, includes high-frequency component detecting including dividing the high-frequency component into bands with a certain interval range correspondingly to the certain bandwidth, and detecting magnitude of the high-frequency components corresponding to each of the bands, compensating the high-frequency components based on the magnitude of the high-frequency components corresponding to each of the bands detected at the high-frequency component detecting, and decoding the low-frequency component decoded from the first encoded data, and the high-frequency components compensated at the compensating, into the audio signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to accompanying drawings.

Figure 1:
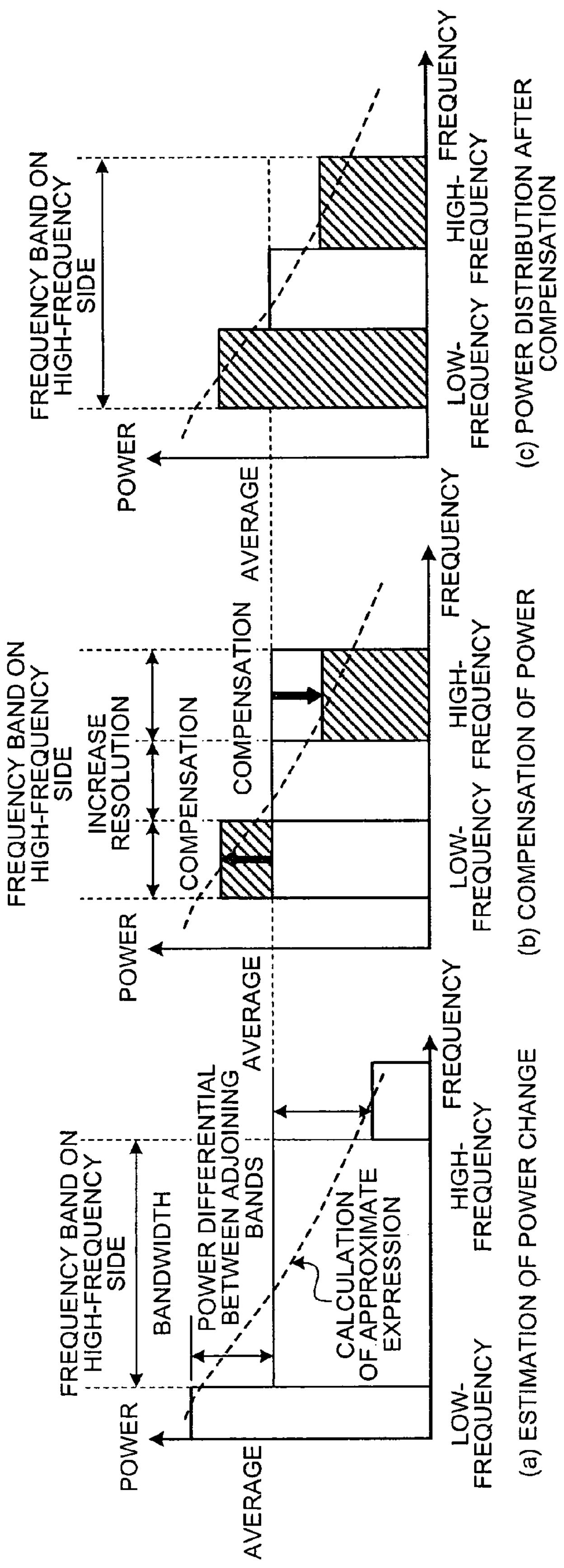
FIG. 1 is a schematic diagram for explaining a decoder according to a first embodiment of the present invention.

An overview and characteristics of a decoder 100 according to the first embodiment of the present invention are explained below. In an example shown in FIG. 1, a high-frequency component is presented on a plane of power and frequency. The decoder 100 divides a band of the high-frequency component in accordance with the frequency resolution of encoding by the Spectral Band Replication (SBR) method, and calculates an approximate expression from the low-frequency side to the high-frequency side based on magnitude of power of an adjacent band on the lower-frequency side and magnitude of power of an adjacent band on the higher-frequency side. A band to be compensated is divided into a plurality of bands (three bands in the example shown in FIG. 1), power of each of the bands is adjusted to correspond to the approximate expression.

Thus, the decoder 100 can compensate the audio signal that is evened out and not optimally encoded to encode it, thereby improving the sound quality of the audio signal.

Figure 2:
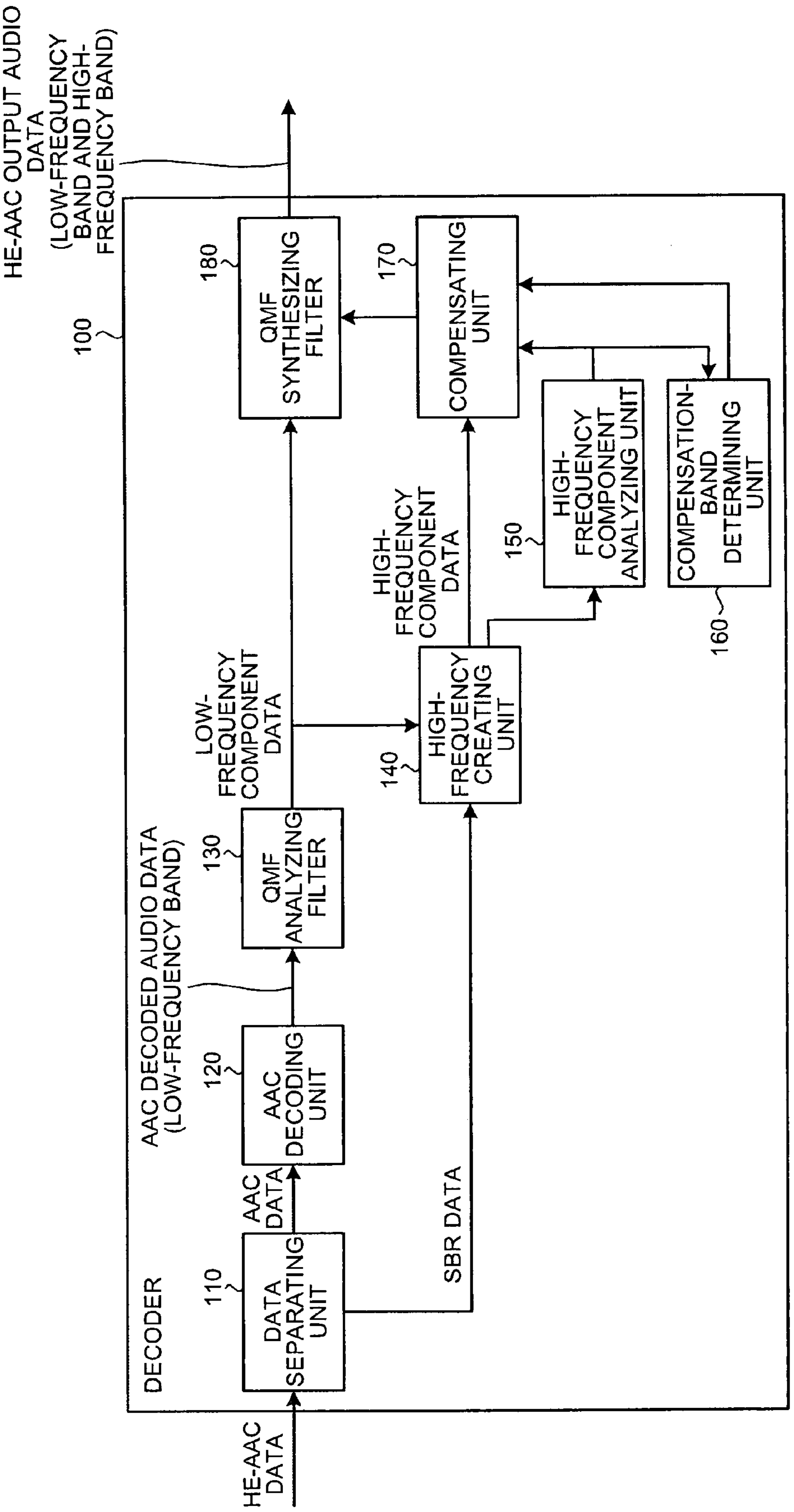
FIG. 2 is a functional block diagram of the decoder shown in FIG. 1.

A configuration of the decoder 100 is explained below. As shown in FIG. 2, the decoder 100 includes a data separating unit 110, an AAC decoding unit 120, a quadrature mirror filter (QMF) analyzing filter 130, a high-frequency creating unit 140, a high-frequency component analyzing unit 150, a compensation-band determining unit 160, a compensating unit 170, and a QMF synthesizing filter 180.

When the data separating unit 110 acquires data encoded according to the HE-AAC method (hereinafter, "HE-AAC data"), the data separating unit 110 separates the HE-AAC data into the Advanced Audio Coding (AAC) data and the SBR data, outputs the AAC data to the AAC decoding unit 120, and outputs the SBR data to the high-frequency creating unit 140. The AAC data is a data that is encoded from the audio signal by the AAC method. The SBR data is a data that is encoded from the audio signal by the SBR method.

The AAC decoding unit 120 decodes the AAC data, and outputs the decoded AAC data as AAC decoded audio data to the QMF analyzing filter 130. The QMF analyzing filter 130 converts a time signal of the AAC decoded audio data into a frequency signal. The QMF analyzing filter 130 converts the AAC decoded audio data into the low-frequency component data that includes relation among the frequency, the time, and the power of the low-frequency component, and outputs the converted low-frequency component data to the high-frequency creating unit 140 and the QMF synthesizing filter 180.

The high-frequency creating unit 140 creates the high-frequency component of the audio signal based on the SBR data acquired from the data separating unit 110 and the low-frequency component data acquired from the QMF synthesizing filter 180. The high-frequency creating unit 140 then outputs the created high-frequency component data as the high-frequency component data of the audio signal to the high-frequency component analyzing unit 150 and the compensating unit 170.

Figure 3:
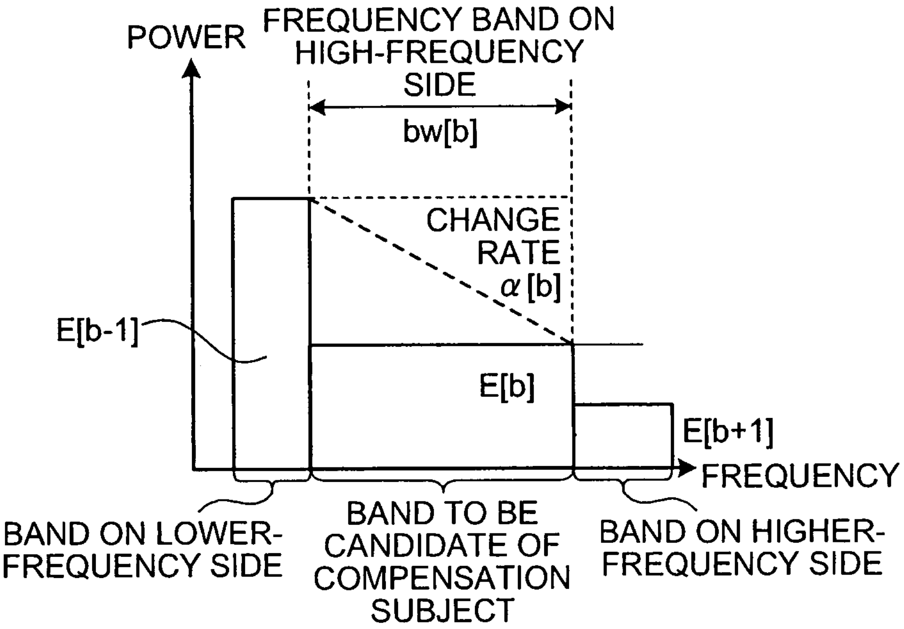
FIG. 3 is a schematic diagram for explaining processing performed by a high-frequency component analyzing unit shown in FIG. 2.

When the high-frequency component analyzing unit 150 acquires the high-frequency component data, the high-frequency component analyzing unit 150 calculates a change rate (proportion of change) in magnitude of power along the frequency direction observed in the acquired high-frequency component data. As shown in FIG. 3, the high-frequency component analyzing unit 150 divides the high-frequency component data into bands with a certain interval range in accordance with the frequency resolution of the SBR method (or the high-frequency component), and calculates a change rate based on magnitude of power corresponding to the divided bands. FIG. 3 depicts an example that the high-frequency component data is divided into three bands for convenience in explaining.

A difference between the power of a band to be compensated and the power of an adjacent band on the lower-frequency side, ΔE[b], can be calculated by the following expression:

$$\Delta E[b]=E[b-1]-E[b]$$

where E[b] denotes the power corresponding to a band to be a candidate of a compensation subject (the b-th band), and E[b−1] denotes the power corresponding to an adjacent band on the lower-frequency side (the (b−1)th band). A change rate α[b] can be calculated by the following expression:

$$\alpha[b]=\Delta E[b]/bw[b]$$

where bw[b] denotes the bandwidth of the band to be a candidate of the compensation subject.

In FIG. 3, the change rate α[b] is calculated from the difference between E[b], the power of the band to be a candidate of the compensation subject, and E[b−1], the power of the adjacent band on the lower-frequency side. However, the present invention is not limited to this. For example, the change rate $\alpha\mathbf{1}[b]$ may be calculated from a difference between the power of a band to be compensated and the power of an adjacent band on the higher-frequency side, E[b+1]. In this case, a difference $\Delta E\mathbf{1}[b]$ may be calculated by the following expression:

$$\Delta E1[b]=E[b]-E[b+1]$$

The change rate $\alpha\mathbf{1}[b]$ in this case can be calculated by the following expression:

$$\alpha 1[b]=\Delta E1[b]/bw[b]$$

Alternatively, a change rate $\alpha\mathbf{2}[b]$ may be calculated from a difference between E[b−1], the power of the adjacent band on the lower-frequency side, and E[b+1], the power of the adjacent band on the higher-frequency side. In this case, a difference $\Delta E\mathbf{2}[b]$ can be calculated by the following expression:

$$\Delta E2[b]=E[b-1]-E[b+1]$$

The change rate $\alpha\mathbf{2}[b]$ in this case can be calculated by the following expression:

$$\alpha 2[b]=\Delta E2[b]/bw[b]$$

The high-frequency component analyzing unit 150 outputs data of the calculated change rate α[b] (or the change rate $\alpha\mathbf{1}[b]$ or the change rate $\alpha\mathbf{2}[b]$) (hereinafter, "change rate data") to the compensation-band determining unit 160 and the compensating unit 170.

When the compensation-band determining unit 160 acquires the change rate data from the high-frequency component analyzing unit 150, the compensation-band determining unit 160 determines a band to be compensated (hereinafter, "compensation subject band") based on the acquired change rate data. Specifically, the compensation-band determining unit 160 compares the change rate α[b] included in the change rate data with a threshold A. If the change rate α[b] is higher than the threshold A, the band corresponding to the change rate α[b] is determined as a compensation subject band, and the determination result is output to the compensating unit 170. In this case, the b-th band from among the divided bands is to be the compensation subject band.

By contrast, if the change rate α[b] is equal to or lower than the threshold A, the compensation-band determining unit 160 determines the band corresponding to the change rate α[b] as a band not to be compensated, and outputs the determination result to the compensating unit 170. In this case, the b-th band from among the divided bands is to be the band not to be compensated.

The compensating unit 170 compensates high-frequency component data based on the change rate data acquired from the high-frequency component analyzing unit 150 and the determination result acquired from the compensation-band determining unit 160. The compensating unit 170 leaves unchanged a band not to be compensated from among the bands in the high-frequency component data based on the determination result, and compensates a band to be compensated based on the change rate data. Compensation of a compensation subject band performed by the compensating unit 170 is explained below.

Figure 4:
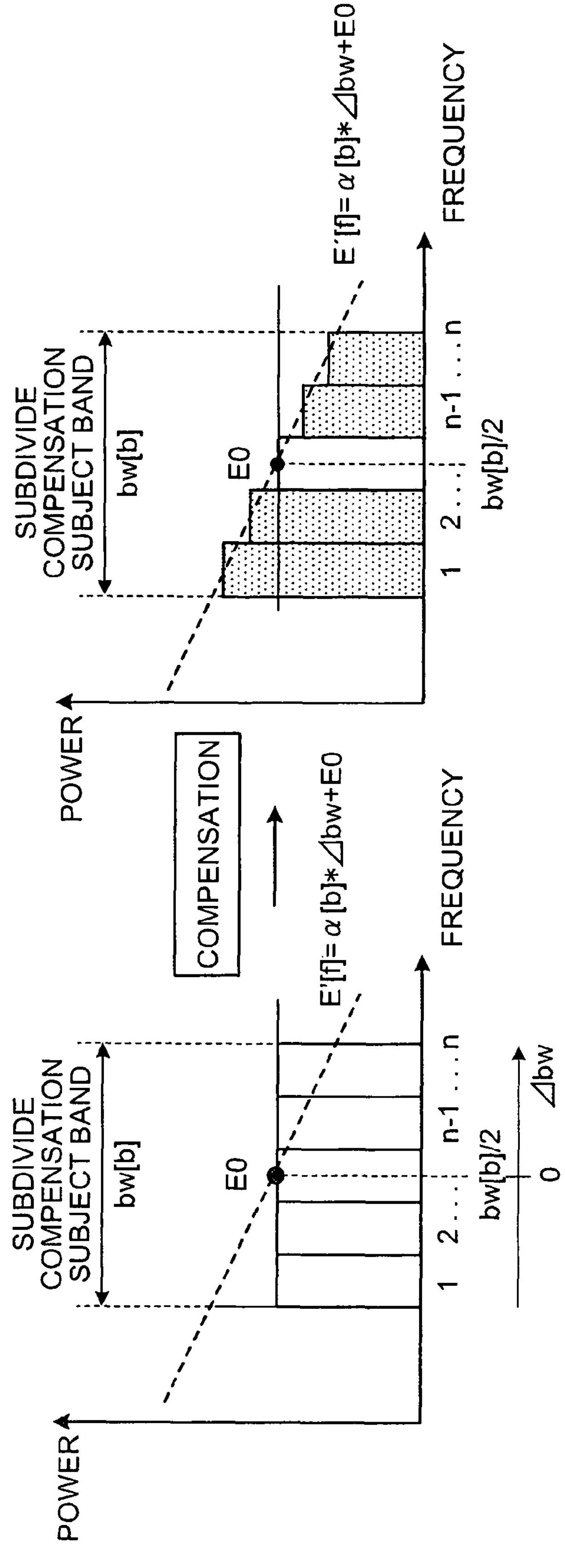
FIG. 4 is a schematic diagram for explaining processing of compensating a compensation subject band by a compensating unit shown in FIG. 2.

As shown in FIG. 4, the compensating unit 170 subdivides a compensation subject band into bands each of which has one or more spectra. The unit of subdivision may be one or more spectra, or uneven. The energy of a subdivided band, E0, is expressed by the following expression:

$$E0=E[b]/bw[b]$$

where bw[b] denotes the bandwidth of the compensation subject band, and E[b] denotes the energy (power) of the compensation subject band.

An approximate expression E'[f] for compensating the compensation subject band is:

$$E'[f]=\alpha[b]\times\Delta bw+E0$$

where α[b] denotes the change rate included in the change rate data. In the equation, Δbw corresponds to a frequency change within the compensation subject band. The compensating unit 170 compensates power of each of the subdivided bands in the compensation subject band in accordance with the approximate expression E' [f].

For example, when compensating power corresponding to the middle of the compensation subject band, Δbw=bw[b]/2; the compensating unit 170 substitutes Δbw=bw[b]/2 into the approximate expression E'[f], and obtains power calculated via the substitution as power after compensation. Similarly, each of the other subdivided bands is also compensated in accordance with magnitude of power that is calculated by substituting a frequency corresponding to the band into the approximate expression E'[f]. The compensating unit 170 outputs the compensated high-frequency component data to the QMF synthesizing filter 180.

The QMF synthesizing filter 180 synthesizes the low-frequency component data acquired from the QMF analyzing filter 130 and the compensated high-frequency component data acquired from the compensating unit 170, and outputs the synthesized data as the HE-AAC output audio data. The HE-AAC output audio data is a result of decoding the HE-AAC data.

Figure 5:
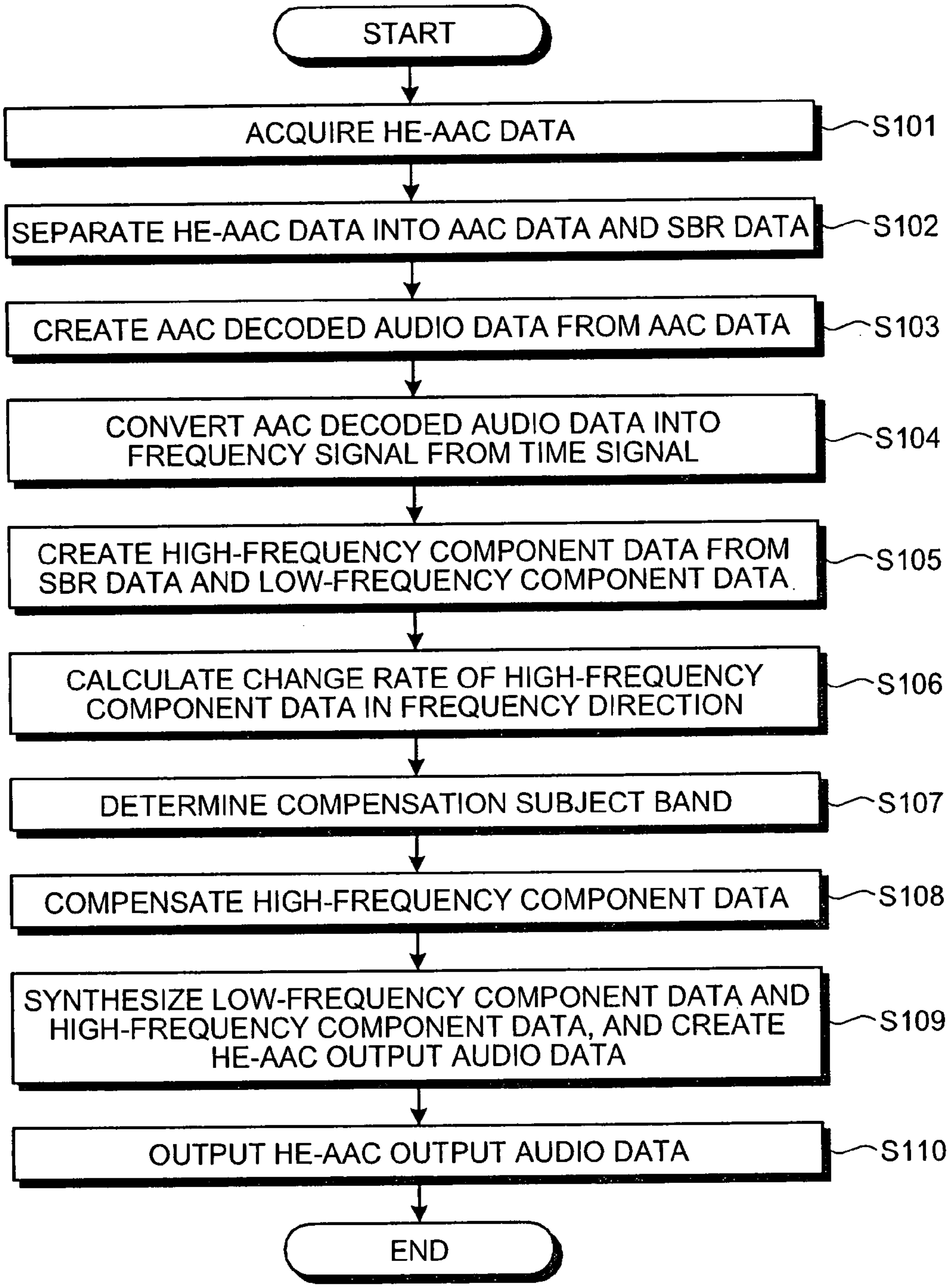
FIG. 5 is a flowchart of a process procedure performed by the decoder shown in FIG. 2.

A process procedure performed by the decoder 100 is explained below. As shown in FIG. 5, in the decoder 100, the data separating unit 110 acquires the HE-AAC data (step S101), and separates the HE-AAC data into the AAC data and the SBR data (step S102).

The AAC decoding unit 120 then creates AAC decoded audio data from the AAC data (step S103), and the QMF analyzing filter 130 converts the AAC decoded audio data into a frequency signal from a time signal (step S104).

The high-frequency creating unit 140 creates high-frequency component data from the SBR data and the low-frequency component data (step S105). The high-frequency component analyzing unit 150 then calculates a change rate of the high-frequency component data in the frequency direction (step S106), and the compensation-band determining unit 160 determines a compensation subject band (step S107).

Subsequently, the compensating unit 170 compensates the high-frequency component data based on the change rate data acquired from the high-frequency component analyzing unit 150 and the determination result acquired from the compensation-band determining unit 160 (step S108). The QMF synthesizing filter 180 synthesizes the low-frequency component data and the high-frequency component data to create the HE-AAC output audio data (step S109), and outputs the HE-AAC output audio data (step S110).

Thus, the compensating unit 170 can compensate the high-frequency component data that is not accurately encoded when encoding, thereby improving the sound quality of the HE-AAC output audio data.

As described above, even if a high-frequency component of the HE-AAC data is not properly encoded, the decoder 100 can compensate the high-frequency component of the HE-AAC data, and can improve the sound quality of the HE-AAC output audio data.

The compensating unit 170 may change the quantity of blocks of subdivision depending on the change rate. For example, the following subdivision is available: if the change rate $\alpha[b]$ is less than a threshold a, the quantity of divided blocks is x; if the change rate $\alpha[b]$ is equal to or more than the threshold a and less than a threshold b, the quantity of divided blocks is y; and if the change rate $\alpha[b]$ is equal to or more than the threshold b, the quantity of divided blocks is z ($x<y<z$). Thus, the compensating unit 170 can compensate the high-frequency component data efficiently.

An overview and characteristics of a decoder 200 according to the second embodiment of the present invention are explained below. The decoder 200 determines a band to be compensated based on a bandwidth appropriate to the time resolution of the high-frequency component, and compensates the compensation subject band of the high-frequency component based on a change rate calculated from a temporal change in energy of the high-frequency component.

Thus, the decoder 200 can determine the compensation subject band efficiently, and can improve the sound quality of the audio signal.

Figure 6:
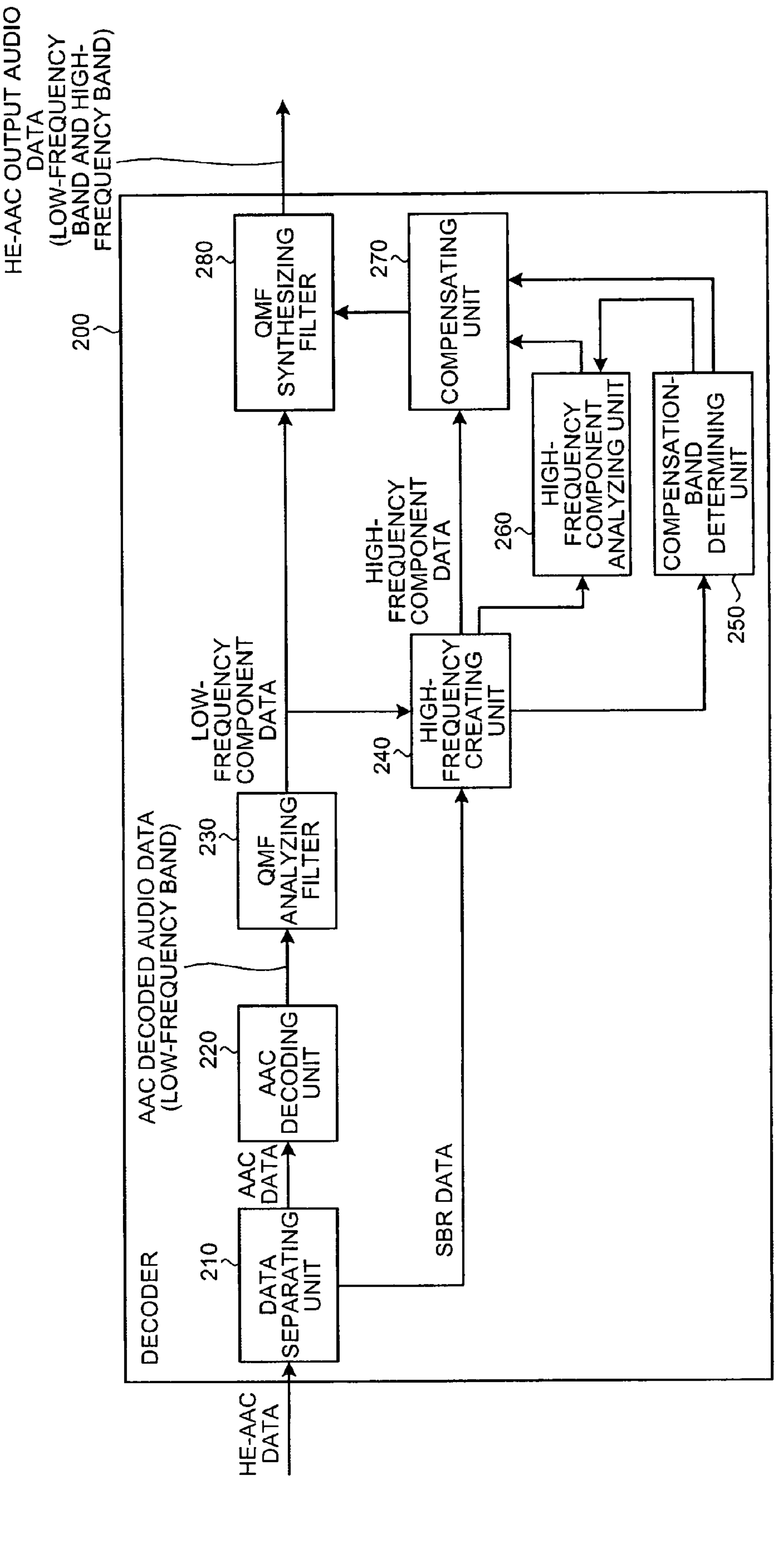
FIG. 6 is a functional block diagram of a decoder according to a second embodiment of the present invention.

A configuration of the decoder 200 is explained below. As shown in FIG. 6, the decoder 200 includes a data separating unit 210, an AAC decoding unit 220, a QMF analyzing filter 230, a high-frequency creating unit 240, a compensation-band determining unit 250, a high-frequency component analyzing unit 260, a compensating unit 270, and a QMF synthesizing filter 280.

When the data separating unit 210 acquires the HE-AAC data, the data separating unit 210 separates the HE-AAC data into the AAC data and the SBR data, outputs the AAC data to the AAC decoding unit 220, and outputs the SBR data to the high-frequency creating unit 240.

The AAC decoding unit 220 decodes the AAC data, and outputs the decoded AAC data as the AAC decoded audio data to the QMF analyzing filter 230. The QMF analyzing filter 230 converts a time signal of the AAC decoded audio data into a frequency signal. The QMF analyzing filter 230 converts the AAC decoded audio data into the low-frequency component data that includes relation among the frequency, the time, and the power of the low-frequency component, and outputs the converted low-frequency component data to the high-frequency creating unit 240 and the QMF synthesizing filter 280.

The high-frequency creating unit 240 creates a high-frequency component of the audio signal based on the SBR data acquired from the data separating unit 210 and the low-frequency component data acquired from the QMF analyzing filter 230. The high-frequency creating unit 240 then outputs the created high-frequency component data as the high-frequency component data of the audio signal to the high-frequency component analyzing unit 260 and the compensating unit 270. Furthermore, the high-frequency creating unit 240 outputs data of a bandwidth appropriate to the time resolution of the high-frequency component data as bandwidth data to the compensation-band determining unit 250.

Figure 7:
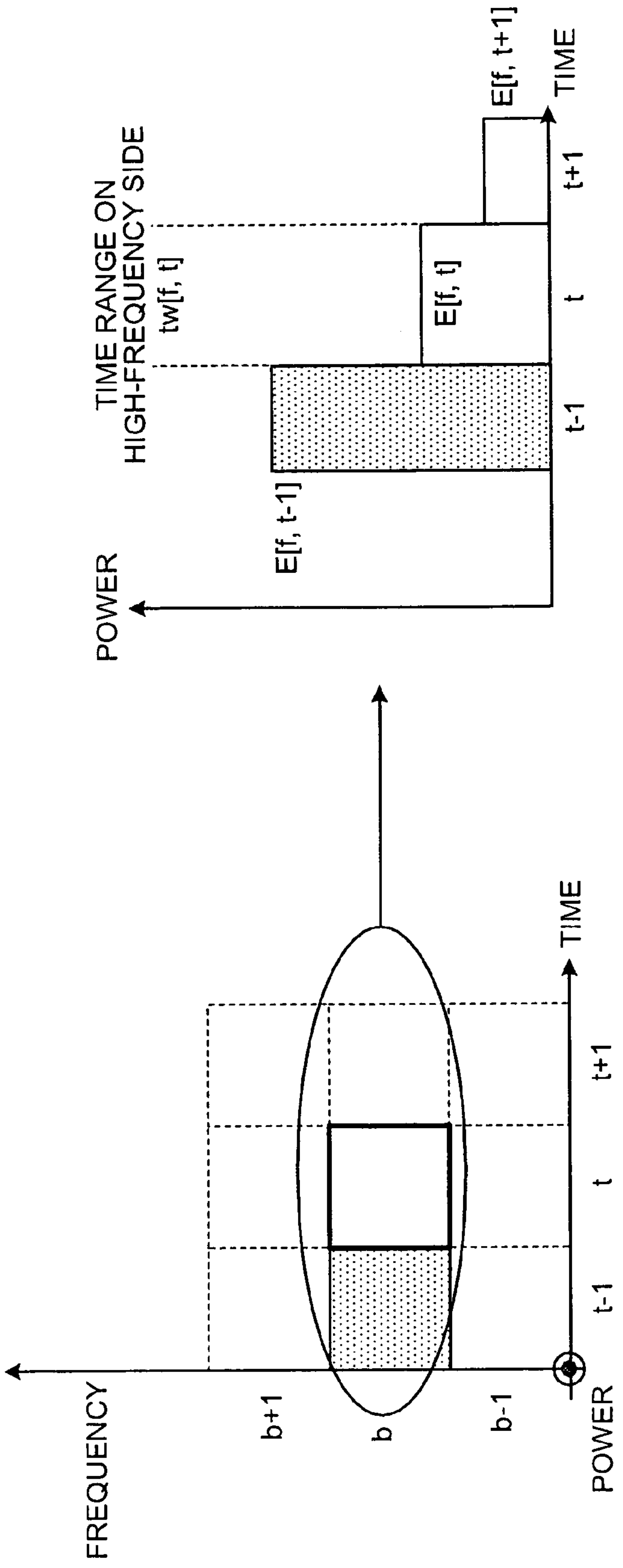
FIG. 7 is a schematic diagram for explaining high-frequency component data.

As shown on the left part in FIG. 7, the high-frequency component data includes parameters, namely, frequency, time, and power (the axis corresponding to the power is perpendicular to the plane surface of the drawing). The right part in FIG. 7 presents the high-frequency component data on the plane of time and power by extracting a row corresponding to a frequency b on the left part.

Figure 8:
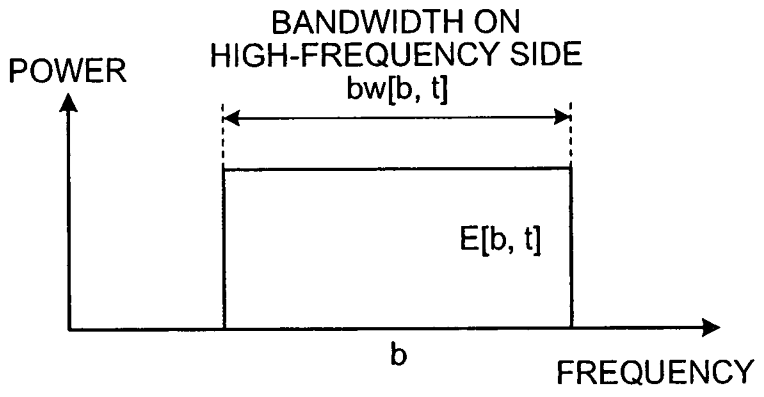
FIG. 8 is a schematic diagram for explaining processing performed by a compensation-band determining unit shown in FIG. 6.

The compensation-band determining unit 250 determines a band to be compensated based on the bandwidth data acquired from the high-frequency creating unit 240. The compensation-band determining unit 250 compares a bandwidth bw[b, t] shown in FIG. 8 with a threshold B. If the bandwidth bw[b, t] is larger than the threshold B, the compensation-band determining unit 250 outputs a band corresponding to the bandwidth bw[b, t] as a compensation subject band to the high-frequency component analyzing unit 260 and the compensating unit 270.

By contrast, if the bandwidth bw[b, t] is equal to or less than the threshold B, the compensation-band determining unit 250 outputs a band corresponding to the bandwidth bw[b, t] as a band not to be compensated to the high-frequency component analyzing unit 260 and the compensating unit 270.

The high-frequency component analyzing unit 260 acquires the high-frequency component data from the high-frequency creating unit 240, and calculates a change rate (proportion of change) in magnitude of power along the time direction observed in the acquired high-frequency component data. The high-frequency component analyzing unit 260 calculates the change rate of magnitude of power corresponding to the compensation subject band, and does not calculate the change rate of magnitude of power related to the other bands. Because a frequency spectrum in the time direction is obtained within the same frame according to the SBR encoding method (see FIG. 7), the high-frequency component analyzing unit 260 can estimate change in magnitude of power from a frequency signal in the time direction.

Figure 9:
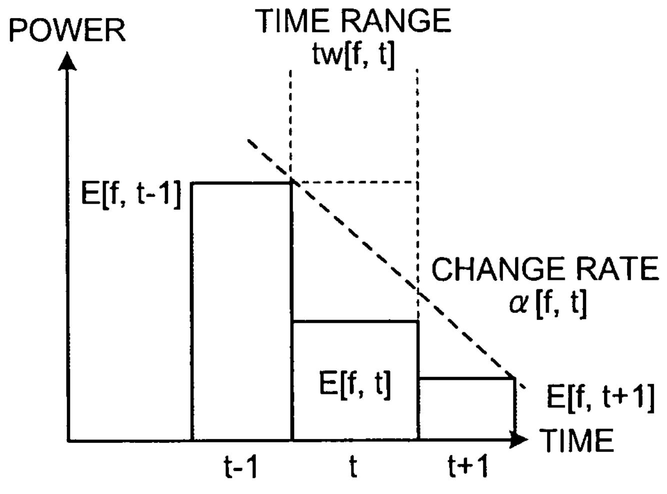
FIG. 9 is a schematic diagram for explaining processing performed by a high-frequency component analyzing unit shown in FIG. 6.

As shown in FIG. 9, the high-frequency component analyzing unit 260 subdivides adjacent bands in the time direction into bands each of which has one or more spectra. The unit of subdivision may be one or more spectra, or uneven. Alternatively, the bands do not need to be subdivided. The power of a subdivided spectrum band, E[f, t], is expressed by the following expression:

$$E[f,t]=E[b,t]/bw[b,t]$$

where bw[b, t] denotes the bandwidth to be a compensation subject, E[b, t] denotes the power of the bandwidth.

A difference of the power of the adjacent bands in the time direction, ΔE[f, t], is expressed by the following expression:

$$\Delta E[f,t]=E[f,t-1]-E[f,t]$$

where E[f, t−1] denotes the power corresponding to the time (t−1), and E[f, t] denotes the power corresponding to the time t. A change rate of the magnitude of the power, α[f, t] is expressed by the following expression:

$$\alpha[f,t]=\Delta E[f,t]/tw[f,t]$$

where tw[f, t] denotes the time width corresponding to a compensation subject band. The high-frequency component analyzing unit 260 outputs data of the calculated change rate α[f, t] (hereinafter, "change rate data") to the compensating unit 270. The method of obtaining the change rate α[f, t] is not limited to the above method. The change rate may be obtained by a non-linear method. The change rate may also be obtained based on temporally forward data, or temporally backward data, or both.

Figure 10:
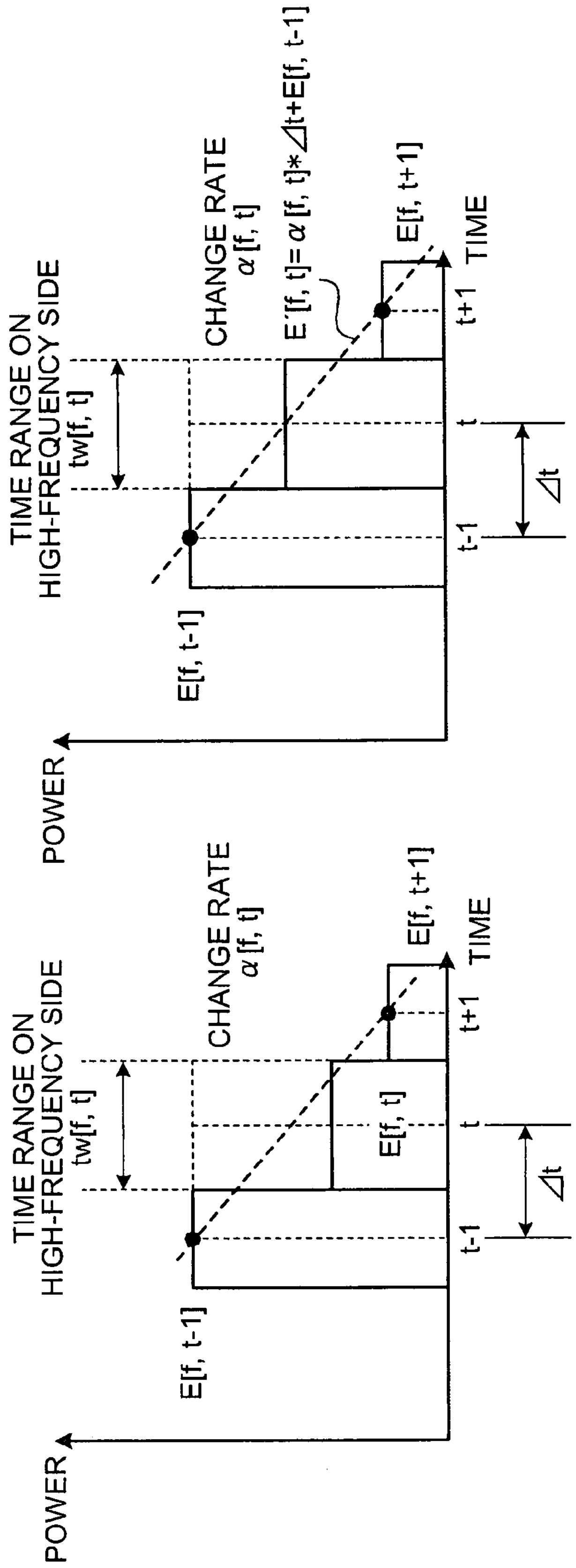
FIG. 10 is a schematic diagram for explaining processing performed by a compensating unit shown in FIG. 6.

The compensating unit 270 compensates the high-frequency component data based on the change rate data acquired from the high-frequency component analyzing unit 260, and the compensation subject band acquired from the compensation-band determining unit 250. As shown in FIG. 10, the compensating unit 270 divides the high-frequency component data into subdivisions with a certain time interval range on the plane of time and power corresponding to the compensation subject band, and compensates power corresponding to each of the divided time ranges. Using a change rate α[f, t], an approximate expression E'[f, t] for compensating the compensation subject band is:

$$E'[f,t]=\alpha[f,t]\times\Delta t+E[f,t-1]$$

In the equation, Δt corresponds to a temporal change amount within the compensation subject band. The compensating unit 270 compensates power corresponding to each of the subdivided time range in accordance with the approximate expression E'[f, t].

For example, when compensating power corresponding to the time t, the compensating unit 270 substitutes the temporal change amount Δt between the time (t−1) and the time t into the approximate expression E'[f, t], and obtains power calculated via the substitution as power after compensation. Similarly, each of the other subdivided bands is also compensated in accordance with magnitude of power that is calculated by substituting a temporal change amount into the approximate expression E'[f, t]. The compensating unit 270 outputs the compensated high-frequency component data to the QMF synthesizing filter 280.

The QMF synthesizing filter 280 synthesizes the low-frequency component data acquired from the QMF analyzing filter 230 and the compensated high-frequency component data acquired from the compensating unit 270, and outputs the synthesized data as the HE-AAC output audio data. The HE-AAC output audio data is a result of decoding the HE-AAC data.

Figure 11:
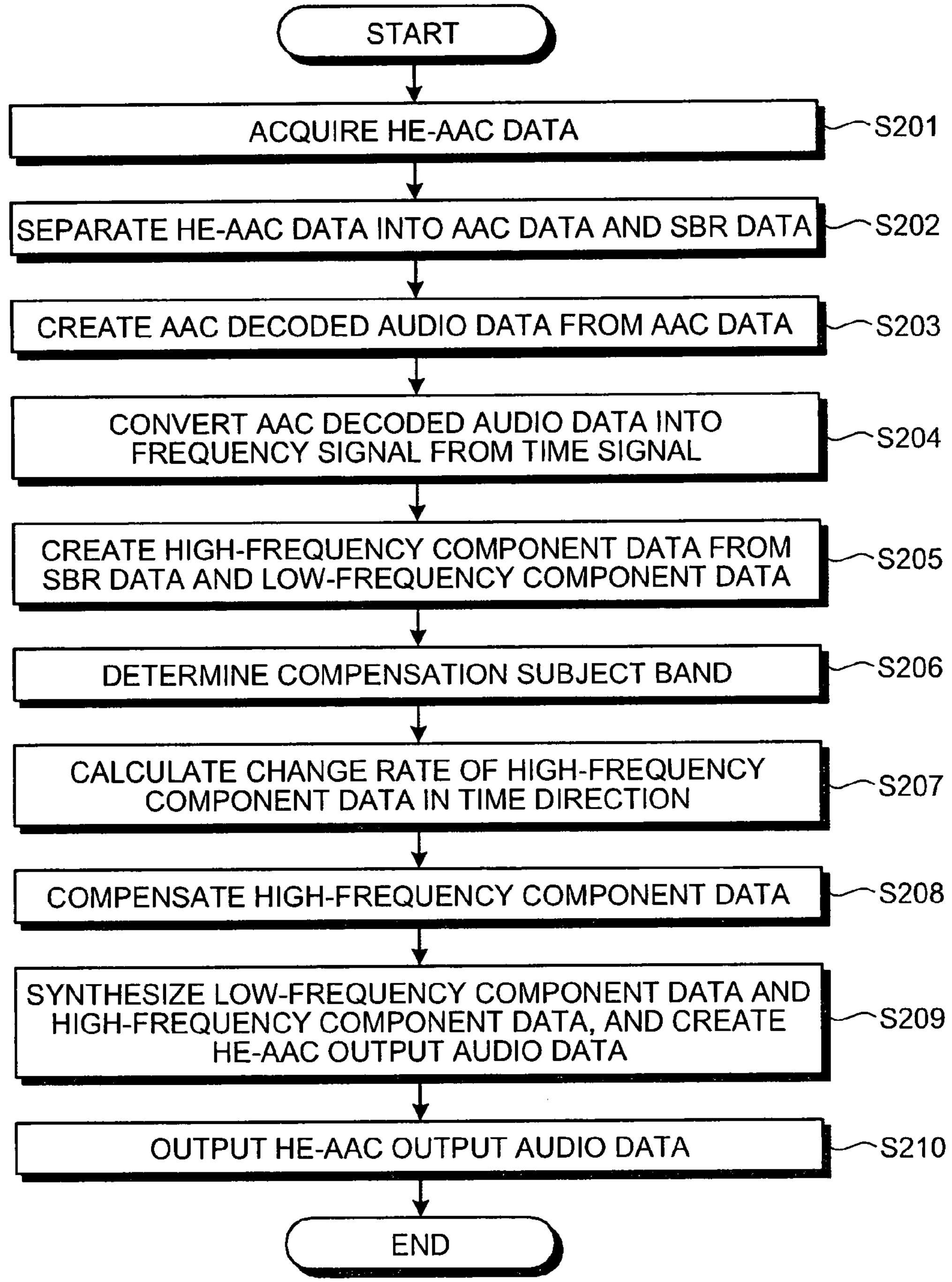
FIG. 11 is a flowchart of a process procedure performed by the decoder shown in FIG. 6.

A process procedure performed by the decoder 200 is explained below. As shown in FIG. 11, in the decoder 200, the data separating unit 210 acquires the HE-AAC data (step S201), and separates the HE-AAC data into the AAC data and the SBR data (step S202).

The AAC decoding unit 220 then creates AAC decoded audio data from the AAC data (step S203), and the QMF analyzing filter 230 converts the AAC decoded audio data into a frequency signal from a time signal (step S204).

The high-frequency creating unit 240 creates high-frequency component data from the SBR data and the component data (step S205). The compensation-band determining unit 250 determines a compensation subject band (step S206). The high-frequency component analyzing unit 260 calculates a change rate of the high-frequency component data in the time direction (step S207).

Subsequently, the compensating unit 270 compensates the high-frequency component data based on the change rate data acquired from the high-frequency component analyzing unit 260 and the compensation subject band acquired from the compensation-band determining unit 250 (step S208). The QMF synthesizing filter 280 synthesizes the low-frequency component data and the high-frequency component data to create the HE-AAC output audio data (step S209), and outputs the HE-AAC output audio data (step S210).

Thus, the compensating unit 270 can compensate the high-frequency component data that is not accurately encoded when encoding, thereby improving the sound quality of the HE-AAC output audio data.

As described above, the decoder 200 can determine a compensation subject band efficiently, and can improve the sound quality of the audio signal.

An overview and characteristics of a decoder 300 according to the third embodiment of the present invention are explained below. The decoder 300 divides a band of the high-frequency component, determines a compensation subject band based on a difference in power between adjacent bands, and compensates a high-frequency component corresponding to a compensation band.

Thus, the decoder 300 can determines the compensation subject band efficiently, and can improve the sound quality of the audio signal.

Figure 12:
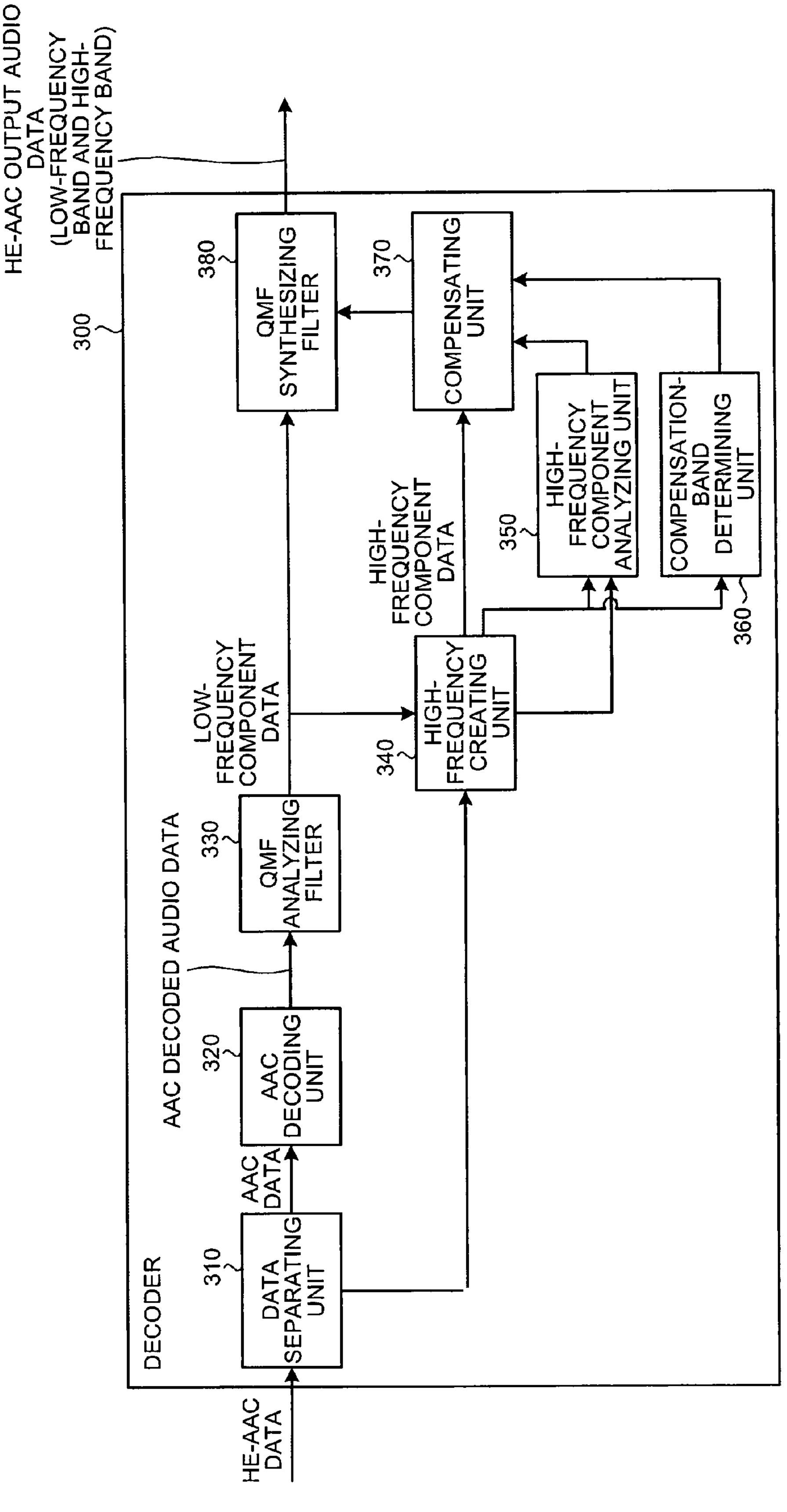
FIG. 12 is a functional block diagram of a decoder according to a third embodiment of the present invention.

A configuration of the decoder 300 is explained below. As shown in FIG. 12, the decoder 300 includes a data separating unit 310, an AAC decoding unit 320, a QMF analyzing filter 330, a high-frequency creating unit 340, a high-frequency component analyzing unit 350, a compensation-band determining unit 360, a compensating unit 370, and a QMF synthesizing filter 380.

When the data separating unit 310 acquires the HE-AAC data, the data separating unit 310 separates the HE-AAC data into the AAC data and the SBR data, outputs the AAC data to the AAC decoding unit 320, and outputs the SBR data to the high-frequency creating unit 340.

The AAC decoding unit 320 decodes the AAC data, and outputs the decoded AAC data as the AAC decoded audio data to the QMF analyzing filter 330. The QMF analyzing filter 330 converts a time signal of the AAC decoded audio data into a frequency signal. The QMF analyzing filter 330 converts the AAC decoded audio data into low-frequency component data that includes relation among the frequency, the time, and the power of the low-frequency component, and outputs the converted low-frequency component data to the high-frequency creating unit 340 and the QMF synthesizing filter 380.

The high-frequency creating unit 340 creates a high-frequency component of the audio signal based on the SBR data acquired from the data separating unit 310 and low-frequency component data acquired from the QMF analyzing filter 330. The high-frequency creating unit 340 then outputs the created high-frequency component data as the high-frequency component data of the audio signal to the high-frequency component analyzing unit 350, the compensation-band determining unit 360, and the compensating unit 370. Furthermore, the high-frequency creating unit 340 outputs bandwidth data of the high-frequency component to the high-frequency component analyzing unit 350.

When the high-frequency component analyzing unit 350 acquires the high-frequency component data, the high-frequency component analyzing unit 350 calculates a change rate (proportion of change) in magnitude of power along the frequency direction observed in the acquired high-frequency component data. Because explanations of processing performed by the high-frequency component analyzing unit 350 are similar to those for the high-frequency component analyzing unit 150 described in the first embodiment, detailed explanations are omitted. The high-frequency component analyzing unit 350 outputs data of the calculated change rate to the compensating unit 370.

When the compensation-band determining unit 360 acquires the high-frequency component data from the high-frequency creating unit 340, the compensation-band determining unit 360 determines a band to be compensated based on the acquired high-frequency component data.

Figure 13:
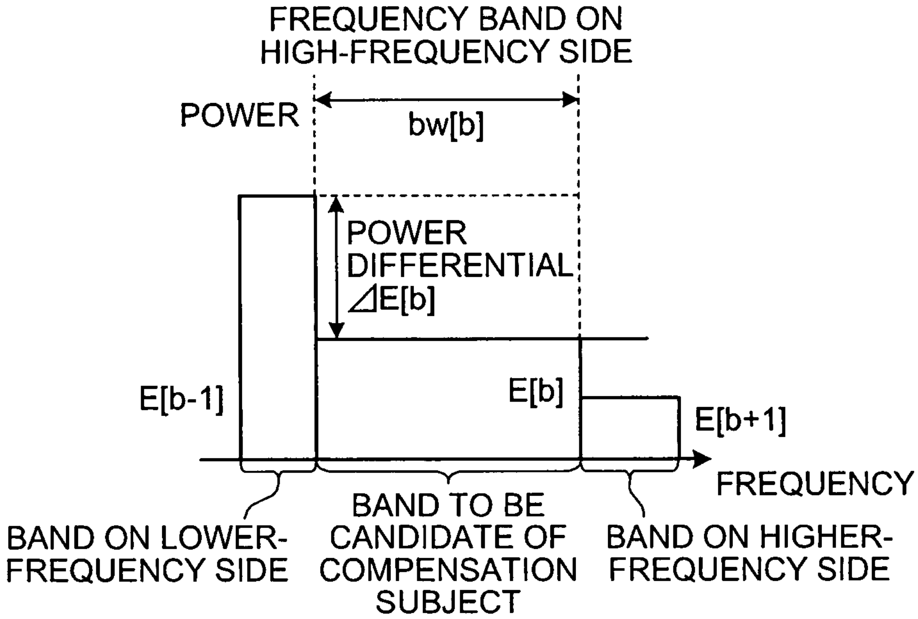
FIG. 13 is a schematic diagram for explaining processing performed by a compensation-band determining unit shown in FIG. 12.

As shown in FIG. 13, the compensation-band determining unit 360 divides the high-frequency component data into a plurality of bands, and determines a compensation subject band based on a difference in power of adjacent divided bands. A difference in the power ΔE[b] is expressed by the following expression:

$$\Delta E[b]=E[b-1]-E[b]$$

where E[b−1] denotes the power corresponding to an adjacent band on the lower-frequency side, and E[b] is the power of a band to be a candidate of the compensation subject. If the difference in the power ΔE[b] is equal to or more than a threshold C, the compensation-band determining unit 360 outputs the band to be a candidate of the compensation subject as a compensation subject band to the compensating unit 370.

Although the compensation subject band is determined from the difference in power between the power of the adjacent band on the lower-frequency side E[b−1] and the power of the band to be a candidate of the compensation subject E[b], the present invention is not limited this. For example, a compensation subject band may be determined from a difference between the power of the band to be a candidate of compensation subject E[b] and the power of the adjacent band on the higher-frequency side E[b+1].

The compensating unit 370 compensates the power of a compensation subject band of the high-frequency component data based on the change rate data acquired from the high-frequency component analyzing unit 350 and data of the compensation subject band acquired from the compensation-band determining unit 360. Compensation performed by the compensating unit 370 is similar to that by the compensating unit 170 described in the first embodiment, therefore explanation for it is omitted. The compensating unit 370 outputs the compensated high-frequency component data to the QMF synthesizing filter 380.

The QMF synthesizing filter 380 synthesizes the low-frequency component data acquired from the QMF analyzing filter 330 and the compensated high-frequency component data acquired from the compensating unit 370, and outputs the synthesized data as the HE-AAC output audio data. The HE-AAC output audio data is a result of decoding the HE-AAC data.

Figure 14:
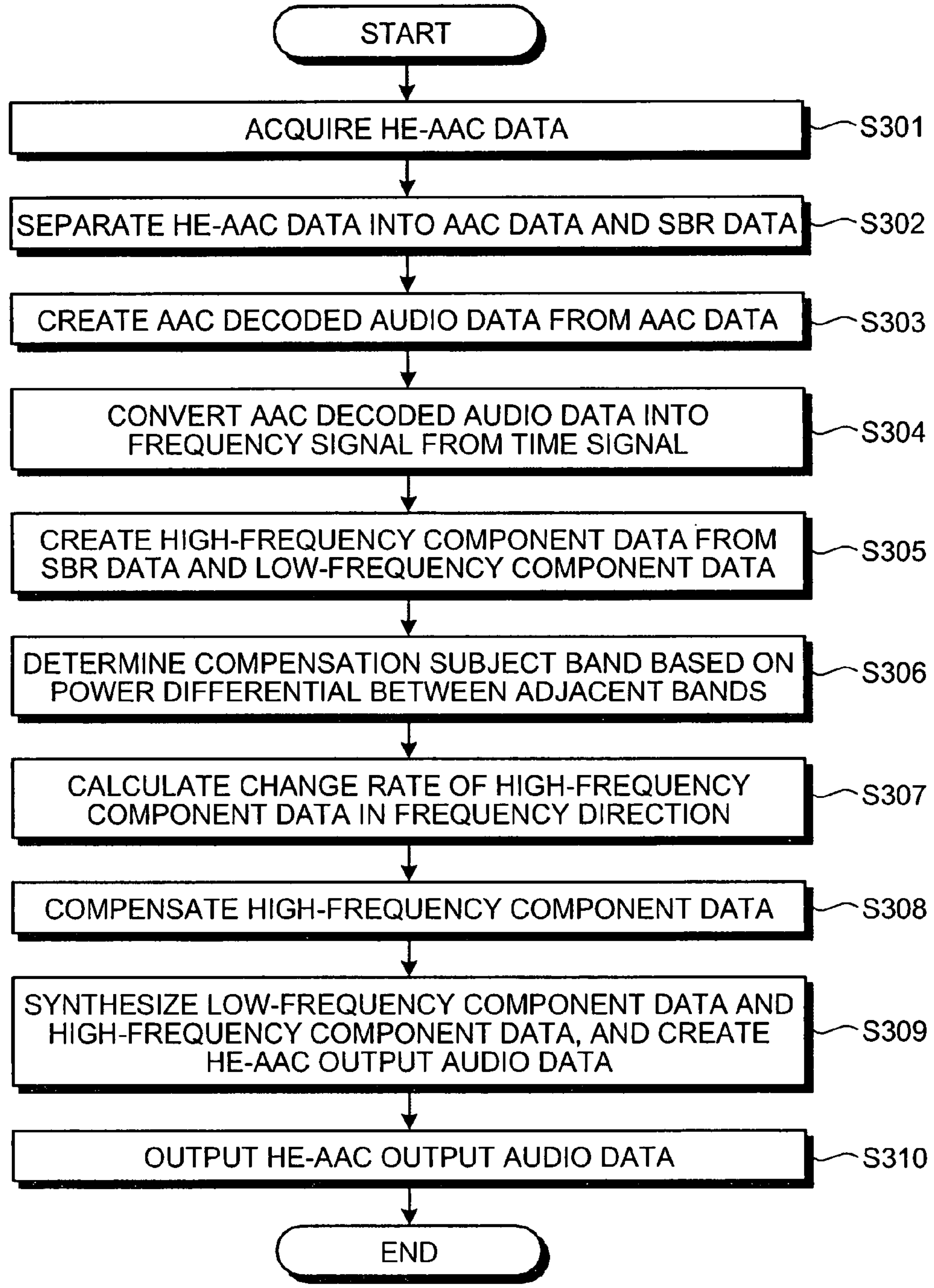
FIG. 14 is a flowchart of a process procedure performed by the decoder shown in FIG. 12.
Figure 15:
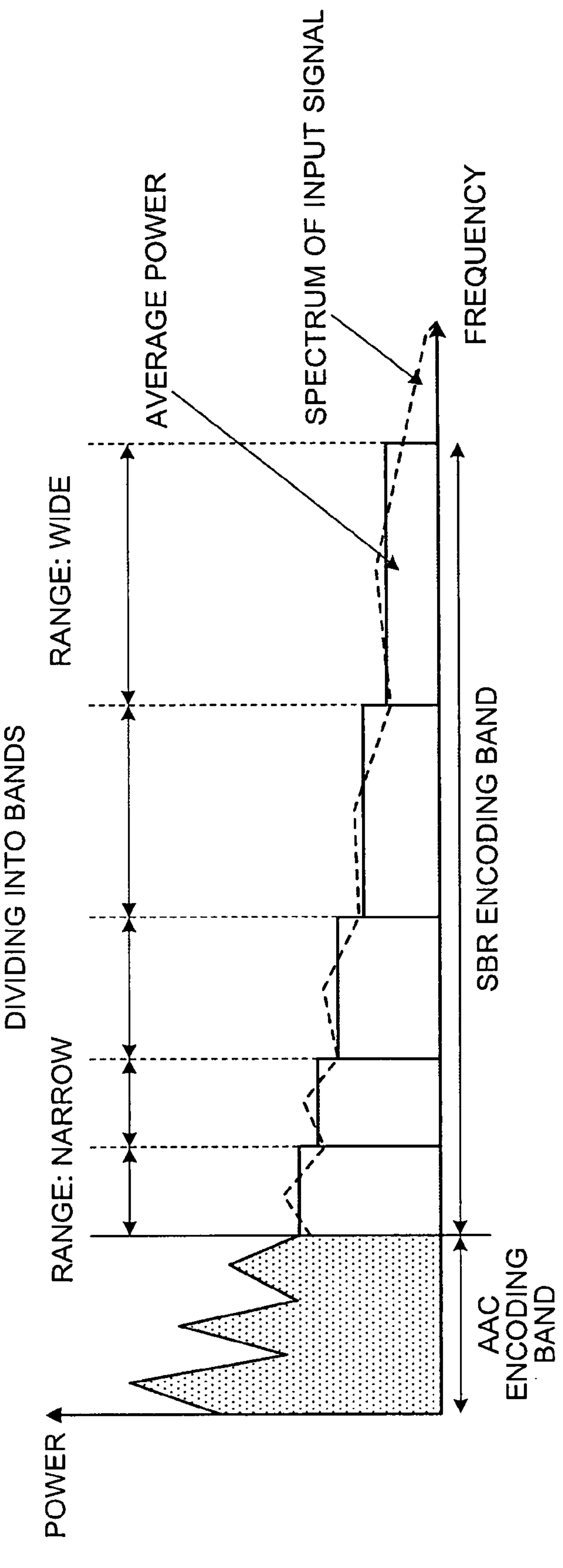
FIG. 15 is a schematic diagram for explaining relation between a bandwidth and frequencies when performing encoding according to the High-Efficiency Advanced Audio encoding method.
Figure 16:
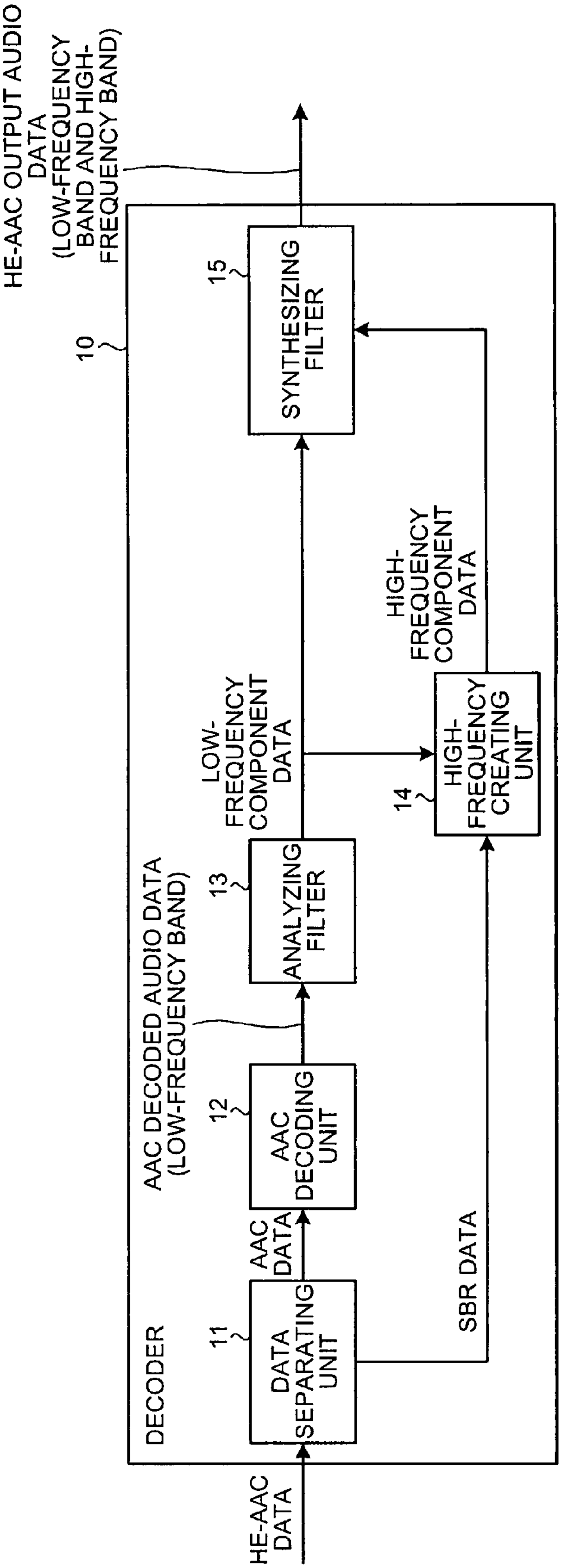
FIG. 16 is a functional block diagram of a decoder according to a conventional technology.
Figure 17:
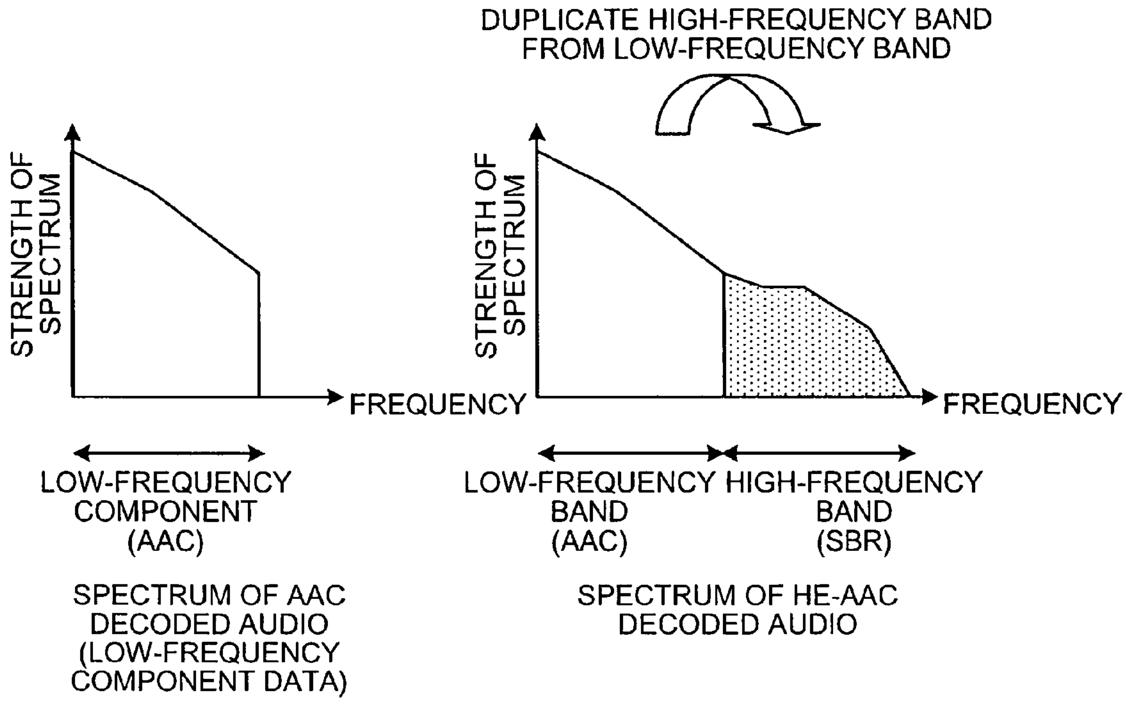
FIG. 17 is a schematic diagram for explaining processing performed by the decoder shown in FIG. 16.
Figure 18:
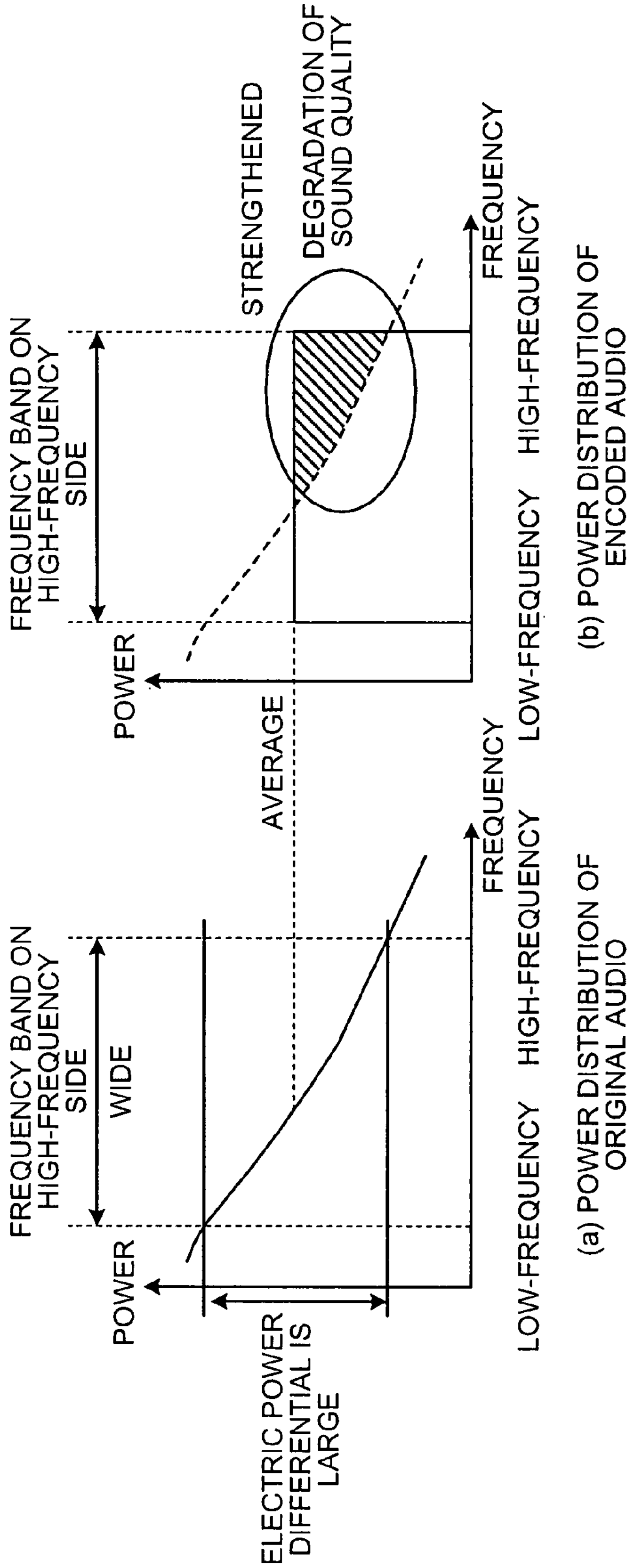
FIG. 18 is a schematic diagram for explaining a problem caused by the conventional technology.

A process procedure performed by the decoder 300 is explained below. As shown in FIG. 14, in the decoder 300, the data separating unit 310 acquires the HE-AAC data (step S301), and separates the HE-AAC data into the AAC data and the SBR data (step S302).

The AAC decoding unit 320 then creates AAC decoded audio data from the AAC data (step S303), and the QMF analyzing filter 330 converts the AAC decoded audio data into a frequency signal from a time signal (step S304).

The high-frequency creating unit 340 creates high-frequency component data from the SBR data and the low-frequency component data (step S305). The compensation-band determining unit 360 determines a compensation subject band based on a difference in power between adjacent bands (step S306), and the high-frequency component analyzing unit 350 calculates a change rate of the high-frequency component data in the frequency direction (step S307).

Subsequently, the compensating unit 370 compensates the high-frequency component data based on the change rate data acquired from the high-frequency component analyzing unit 350 and the compensation subject band acquired from the compensation-band determining unit 360 (step S308). The QMF synthesizing filter 380 synthesizes the low-frequency component data and the high-frequency component data to create the HE-AAC output audio data (step S309), and outputs the HE-AAC output audio data (step S310).

Thus, the compensating unit 370 can compensate the high-frequency component data that is not accurately encoded when encoding, thereby improving the sound quality of the HE-AAC output audio data.

As described above, the decoder 300 can determine a compensation subject band efficiently, and can improve the sound quality of the audio signal.

In addition to the embodiments described above, the present invention can be implemented in various embodiments within the scope of technical concepts described in the claims.

Among the processing explained in the embodiments, the whole or part of the processing explained as processing to be automatically performed can be performed manually, and the whole or part of the processing explained as processing to be manually performed can be automatically performed in a known manner.

The process procedures, the control procedures, specific names, information including various data and parameters shown in the description and the drawings can be changed as required unless otherwise specified.

Each of the configuration elements of each device shown in the drawings is functional and conceptual, and not necessarily to be physically configured as shown in the drawings. In other words, a practical form of separation and integration of each device is not limited to that shown in the drawings. The whole or part of the device can be configured by separating or integrating functionally or physically by any scale unit depending on various loads or use conditions.

According to an aspect of the present invention, even if a high-frequency component is not properly encoded, the audio signal can be accurately decoded by compensating the high-frequency component.

According to another aspect of the present invention, even if a high-frequency component is not properly encoded, the high-frequency component can be accurately compensated.

According to still another aspect of the present invention, even if a high-frequency component is not properly encoded, power of the high-frequency component in the direction of frequency can be accurately compensated.

According to still another aspect of the present invention, even if a high-frequency component is not properly encoded, power of the high-frequency component in the direction of time can be accurately compensated.

According to still another aspect of the present invention, a band of a high-frequency component to be compensated can be accurately determined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A decoding apparatus that decodes a first encoded data that is encoded from a low-frequency component of an audio signal, and a second encoded data that is used when creating a high-frequency component of an audio signal from a low-frequency component and encoded in accordance with a certain bandwidth, into the audio signal, the decoding apparatus comprising:

a high-frequency component detecting unit that divides the high-frequency component into bands with a certain interval range correspondingly to the certain bandwidth, and detects magnitude of power of the high-frequency components corresponding to each of the bands;

a compensation-band determining unit that determines a band of a compensation subject which is a high-frequency component to be compensated based on an interval range of the high-frequency components divided by the high-frequency component detecting unit;

a high-frequency component compensating unit that acquires a difference value by subtracting a power corresponding to the band of the compensation subject from a power corresponding to an adjacent band, acquires a change rate by dividing the difference value by a bandwidth of the band of the compensation subject, acquires an energy of a subdivided band by dividing the power corresponding to the band of the compensation subject by the bandwidth of the band of the compensation subject, acquires a compensating power by adding the energy of the subdivided band to a value which is computed by multiplying the change rate by a frequency change within the band of the compensation subject, and compensates the compensation subject in accordance with the compensating power; and a decoding unit that decodes the low-frequency component decoded from the first encoded data, and the high-frequency components compensated by the high-frequency component compensating unit, into the audio signal.

2. The decoding apparatus according to claim 1, wherein the high-frequency component compensating unit acquires a difference value by subtracting a power corresponding to the band of the compensation subject from a power corresponding to an adjacent band in a time direction, acquires a change rate by dividing the difference value by a time width corresponding to the band of the compensation subject, acquires an energy of a subdivided band by dividing the power corresponding to the band of the compensation subject by the time width corresponding to the band of the compensation subject, acquires a compensating power by adding the energy of the subdivided band to a value which is computed by multiplying the change rate by a temporal change amount within the band of the compensation subject, and compensates the compensation subject in accordance with the compensating power.

3. The decoding apparatus according to claim 1, further comprising a compensation-band determining unit that determines a band of a high-frequency component to be compensated based on a change in magnitude of an adjacent high-frequency component from among the high-frequency components divided into the bands with the certain interval range by the high-frequency component detecting unit.

4. The decoding apparatus according to claim 1, further comprising a compensation-band determining unit that determines that a band of a high-frequency component to be compensated is a band having a difference in magnitude equal to or higher than a threshold with the magnitude of an adjacent high-frequency component from among the high-frequency components divided into the bands with the certain interval range by the high-frequency component detecting unit.

5. A decoding method for decoding a first encoded data that is encoded from a low-frequency component of an audio signal, and a second encoded data that is used when creating a high-frequency component of an audio signal from a low-frequency component and encoded in accordance with a certain bandwidth, into the audio signal, the decoding method comprising:

high-frequency component detecting, using a microprocessor, including dividing the high-frequency component into bands with a certain interval range correspondingly to the certain bandwidth, and detecting magnitude of power of the high-frequency components corresponding to each of the bands;

determining, using a microprocessor, a band of a compensation subject which is a high-frequency component to be compensated based on an interval range of the high-frequency components divided at the high-frequency component detecting;

acquiring a difference value by subtracting a power corresponding to the band of the compensation subject from a power corresponding to an adjacent band;

acquiring a change rate by dividing the difference value by a bandwidth of the band of the compensation subject;

acquiring an energy of a subdivided band by dividing the power corresponding to the band of the compensation subject by the bandwidth of the band of the compensation subject;

acquiring a compensating power by adding the energy of the subdivided band to a value which is computed by multiplying the change rate by a frequency change within the band of the compensation subject;

compensating, using a microprocessor, the compensation subject in accordance with the compensating power; and decoding the low-frequency component decoded from the first encoded data, and the high-frequency components compensated at the compensating, into the audio signal.

6. The decoding method according to claim 5, acquiring a difference value by subtracting a power corresponding to the band of the compensation subject from a power corresponding to an adjacent band in a time direction;

acquiring a change rate by dividing the difference value by a time width corresponding to the band of the compensation subject;

acquiring an energy of a subdivided band by dividing the power corresponding to the band of the compensation subject by the time width corresponding to the band of the compensation subject;

acquiring a compensating power by adding the energy of the subdivided band to a value which is computed by multiplying the change rate by a temporal change amount within the band of the compensation subject; and compensating, using a microprocessor, the compensation subject in accordance with the compensating power.

7. The decoding method according to claim 5, further comprising determining, using a microprocessor, a band of a high-frequency component to be compensated based on a change in magnitude of an adjacent high-frequency component from among the high-frequency components divided into the bands with the certain interval range at the high-frequency component detecting.

8. The decoding method according to claim 5, further comprising determining, using a microprocessor, that a band of a high-frequency component to be compensated is a band having a difference in magnitude equal to or higher than a threshold with the magnitude of an adjacent high-frequency component from among the high-frequency components divided into the bands with the certain interval range at the high-frequency component detecting.

* * * * *

UNITED STATES PATENT AND TRADEMARK OFFICE

CERTIFICATE OF CORRECTION

PATENT NO. : 8,788,275 B2
APPLICATION NO. : 11/902325
DATED : July 22, 2014
INVENTOR(S) : Miyuki Shirakawa et al.

It is certified that error appears in the above-identified patent and that said Letters Patent is hereby corrected as shown below:

In the Claims,

Column 14, Line 44, In Claim 6, after "claim 5," Insert -- further comprising: --.

Signed and Sealed this
Twenty-eighth Day of October, 2014

Michelle K. Lee

Michelle K. Lee
*Deputy Director of the United States Patent and Trademark Office*